United States Patent [19]

Dutton

[11] Patent Number: 5,212,812

[45] Date of Patent: May 18, 1993

[54] END-OF-TRANSMISSION KEYING DEVICE

[75] Inventor: Roy F. Dutton, Orlando, Fla.

[73] Assignee: Mr. Jiggs CB Development, Inc., Salt Springs, Fla.

[21] Appl. No.: 590,943

[22] Filed: Oct. 1, 1990

[51] Int. Cl.⁵ .................................... H04B 1/38
[52] U.S. Cl. ........................... 455/73; 455/79; 455/115
[58] Field of Search .............. 455/73, 84, 79, 116, 455/115, 68, 69, 58; 375/68; 379/58

[56] References Cited

U.S. PATENT DOCUMENTS 4,082,919  4/1978  Day et al. ...................... 455/58

Primary Examiner—Reinhard J. Eisenzopf
Assistant Examiner—Almaz Woldu
Attorney, Agent, or Firm—Macdonald J. Wiggins

[57] ABSTRACT

A device automatically re-keys a transmitter after a transmission ceases, and thereafter transmits a preselected audio signal. The device has a key-open sensor for sensing the end of a transmission and for initiating the audio signal. A keying circuit is controlled by the sensor to re-key the transmitter. An audio sensor senses the presence of the audio signal and controls the keying circuit to un-key the transmitter when the audio signal ceases.

7 Claims, 2 Drawing Sheets

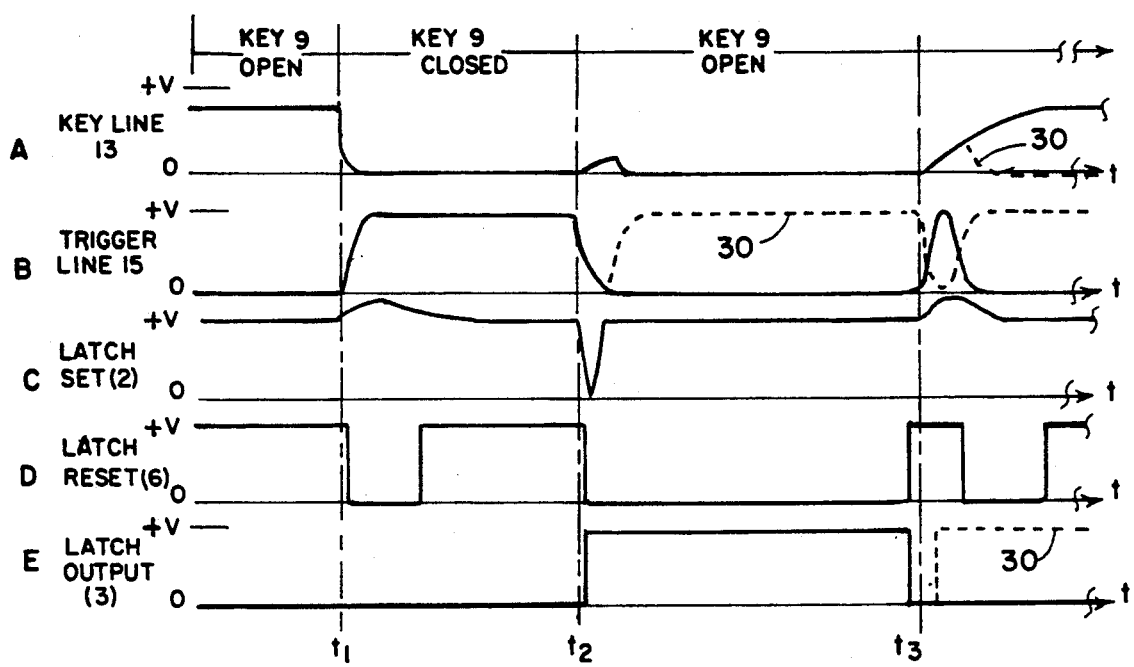

END-OF-TRANSMISSION KEYING DEVICE

BACKGROUND OF THE INVENTION

1. Field of the Invention

The present invention relates to radio transmission, and more particularly to a keying device for adding an audio signal at the end of a normal transmission.

2. Description of the Prior Art

It is common in two-way radio transmissions to add an additional audio signal when an information bearing transmission completed. Such audio signals alert the receiving party that the transmission is ended, and the receiving party may respond. Some transmission systems are supplied with internal circuitry that provides this function. However, a variety of two-way radio systems do not provide this function.

For example, radio operators often desire to add a novel sound burst, distinctive of the operator, when a transmission is completed. Thus, there is a need for a device that may be connected to existing transmitters to sense the end of a transmission, re-key the transmitter, and modulate the radio signal with a sound signal.

SUMMARY OF THE INVENTION

The present invention includes a key-open sensor connected to the microphone key input of the transmitter. When the transmitter is operating, the key input is grounded, and the system of the invention is idle. At the end of a transmission, the user opens the microphone key, causing the key-open sensor to close an electronic key switch, reenergizing the transmitter. The key sensor also produces a trigger signal. The trigger signal sets a latch, and also turns on an external sound module that produces the desired audio signal.

As will be understood, the sound module is not a part of the invention, and may be selected to produce a tone, sound effects, a speech message, or the like. The sound module output is connected to the audio input of the transmitter. As the transmitter is re-keyed, the audio signal from the sound module is transmitted. A connection from the transmitter audio is provided to an audio sensor circuit of the invention that monitors the audio signal. When the audio signal ceases, after a short delay, the audio sensor resets the latch, permitting the electronic key to open, and turning off the transmitter. The latch provides an inhibit signal to the electronic key to prevent re-keying after the audio signal is completed.

It is therefore a principal object of the invention to provide a device for re-keying a radio transmitter after completion of a message transmission, and keying a short audio signal.

It is another object of the invention to provide means for inserting a preselected audio signal or message at the end of a message transmission without any action by the user.

It is still another object of the invention to provide a device having a key-open detector for sensing the end of a radio transmission, an auxiliary keying circuit for re-keying the transmitter and transmitting a preselected audio signal.

These and other objects and advantages will become apparent from the following detailed description when read in conjunction with the drawings.

BRIEF DESCRIPTION OF THE DRAWINGS

FIG. 3 is a waveform diagram showing the operation of logic operations of the invention; and FIG. 4 is the latch circuit of FIG. 2.

DETAILED DESCRIPTION OF THE PREFERRED EMBODIMENT

Figure 1:
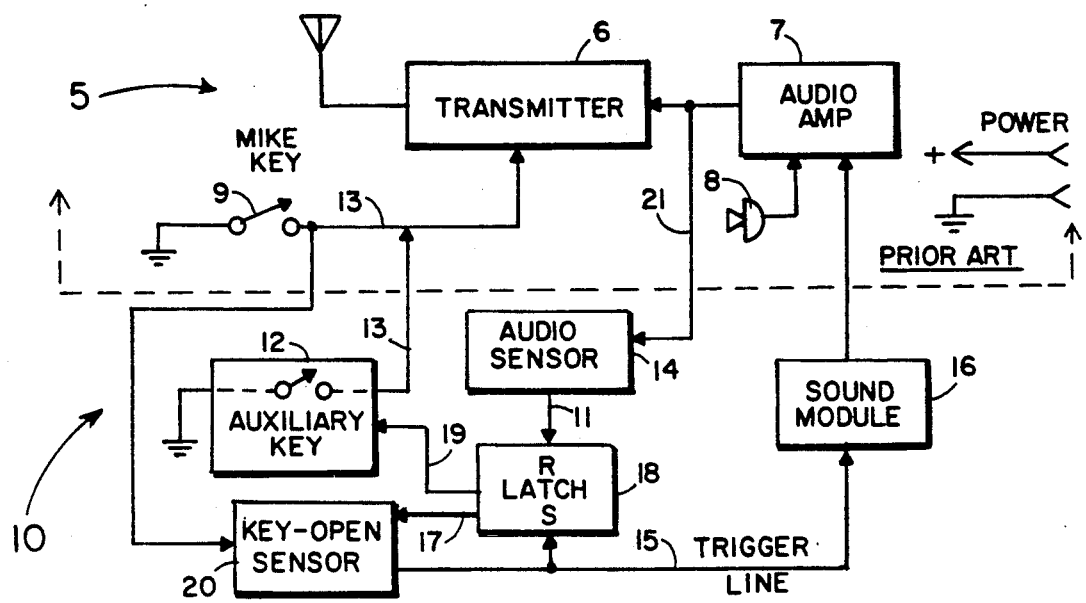
FIG. 1 is a block diagram of the device of the invention shown connected to a transmitter and sound module.

Referring to FIG. 1, a simplified block diagram of the end-of-transmission keying device is shown. A prior art transmitter 6 is normally modulated by speech from microphone 8 and audio amplifier 7. The user operates microphone key 9 to ground keying lead 13 during a transmission. When key 9 is open keying lead 13 is generally several volts positive. In accordance with the invention, an auxiliary keying circuit 12 is provided that is controlled to ground keying line 13 immediately after the user releases microphone key 9. Auxiliary keying circuit 12 is operated, via latch 18, by key-open sensor 20 that senses when the ground is removed from line 13. Latch 18 also produces an inhibit signal on lead 17 to key-open sensor 20 that prevents retriggering by the device at the end of an initial cycle.

When key-open sensor 20 operates, it produces a trigger pulse on trigger lead 15 that sets latch 18, and turns sound module 16 on. The audio output from sound module 16 is monitored by audio sensor 14. When the message or audio program of sound 2.4 after a module 16 is completed, audio sensor 14 resets latch-. short delay, permitting auxiliary keying circuit 12 to open, thus completing the cycle.

Figure 2:
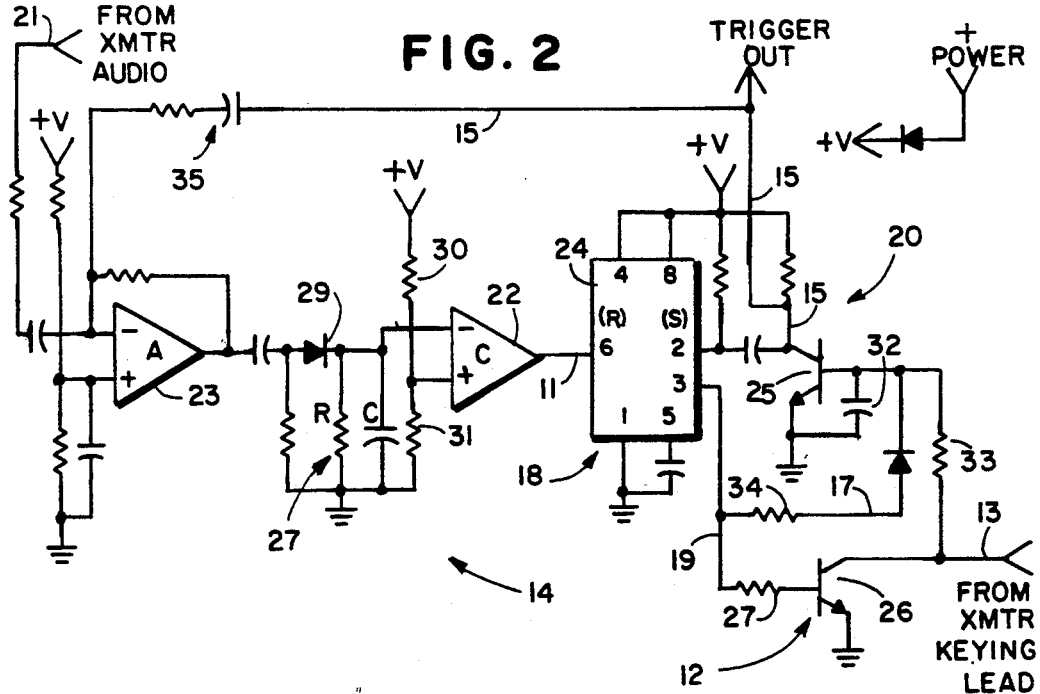
FIG. 2 is schematic diagram of a preferred embodiment of the device of FIG. 1.

A preferred embodiment of the invention is shown in the schematic diagram of FIG. 2. Auxiliary keying circuit 12 utilizes switch transistor 26 having its collector connected to keying lead 13 of the transmitter to be controlled. When the transmitter key switch is closed for a normal transmission, the collector of transistor 26 is grounded and is nonconducting. At the end of the normal transmission, lead 13 will go positive. Key-open sensor 20 includes transistor 25 which is turned on when lead 13 goes positive via resistor 33, which may have a resistance on the order of 220K ohms, as capacitor 32 charges. Capacitor 32 may be about 0.001 ufd, and provides a key bounce filter. The voltage at the collector of transistor 25 drops, placing a LOW on trigger line 15, and produces a short pulse at the SET pin of latch circuit 24 of latch 18 via coupling capacitor 35. Latch may be a type 555 integrated circuit connected as a set-reset flip-flop. The LOW trigger signal is applied o a sound module of FIG. 1, producing audio signals which appear on lead 21, connected to audio amplifier 23 of audio sensor circuit 14.

The LOW at the SET pin of latch circuit 24 causes pin 3 to go HIGH, turning auxiliary key transistor ON, re-keying the transmitter. Also, the HIGH is applied to the base of key-open sensor transistor 25 to inhibit re-keying of transistor 26 when the key lead 13 goes HIGH at the end of a current cycle. Trigger line 15 also connects to amplifier 23 of audio sensor 14 to provide an anticipate signal. Since the audio from a sound module may not start immediately after activation, the output from comparator 22 could reset latch 18. The trigger signal via RC circuit 35 quickly charges RC circuit 27 via rectifier 29, turning comparator OFF. When the audio signal on lead 21 is amplified by amplifier 23 and rectified by diode 29, RC delay circuit 27 charges and the dc voltage at the negative terminal of comparator 22 maintains the comparator OFF through any pauses in the audio program. When the audio message from module 16 is completed, RC circuit 27 discharges permitting comparator 22 go HIGH when the voltage at the negative input drops below the voltage set by the resistive divider 30, 31. The output HIGH is applied to the RESET pin of latch circuit 24, and, since the SET pin is at a HIGH level, latch 24 is reset causing pin 3 thereof to go LOW, turning keying transistor 26 OFF. Keying lead 13 returns to the unoperated positive voltage state.

As mentioned hereinabove, an inhibit signal has been placed at the base of sense transistor 25 the pin 3 HIGH of latch 2.4 via resistor 34 which may be about 10K ohms, charging capacitor 32. Even though keying lead 13 is at essentially ground potential during operation of the sound module, transistor 25 is maintained conducting by the inhibit signal. At the end of a cycle, when latch 24 is reset, pin 3 goes LOW, the inhibit signal is removed, and keying lead 13 goes positive with some delay. Since the positive inhibit signal had held transistor 25 in a LOW state, it develops a positive pulse and therefore no LOW trigger signal is produced on the SET pin of latch circuit 24. When the user next operates the microphone key, lead goes to ground, and capacitor 32 discharges through resistor 33.

The operation of the invention may be better understood with reference to FIGS. 3 and 4 showing the logic waveforms at latch circuit 24, and the truth table for the preferred type 555 integrated circuit connected as a latch. Line A of FIG. 3 indicates the values of potentials on key line 13 during a complete cycle of operation. Key 9 is open at $t_0$ for a standby condition of the transmitter with key line 13 having a potential slightly less than the supply voltage +V. When the operator closes key 9 of FIG. 1 at time $t_1$, key line 13 is grounded and drops to zero voltage after a brief circuit charge period. Trigger line 15 has been at zero potential prior to $t_1$, and now rises to +V when transistor 25 turns off. The SET pin of latch 24, which has been at +V level receives a small positive going pulse from the trigger line 13, and the trigger line rise is differentiated by RC circuit and temporarily causes latch RESET pin to go LOW. Latch output pin 3 has been at zero potential. As noted from FIG. 4, no change occurs when latch circuit 24 resets.

At the end of the transmission ($t_2$), key 9 is opened and key line 13 begins to go positive. This voltage turns transistor on causing trigger line 15 to go to essentially zero potential. A negative-going pulse at set pin 2 of latch circuit 24 causes pin thereof to go HIGH, turning keying transistor 26 on, and the inhibit pulse from pin 3 turns transistor 25 back on, reducing the voltage on trigger line 15 to zero. As indicated by dashed waveforms 30, the trigger line would return to +V if the inhibit pulse were not provided. However, the negative-going transition of trigger line 15 performs two functions. First, the pulse at amplifier 23 causes a LOW at pin 6 of latch circuit 24 permitting the negative pulse on pin 2 to set the latch. Thus, output pin 3 goes HIGH, and the resulting inhibit pulse at transistor 25 holds trigger line at zero potential. Second, the trigger pulse on line 15 turns sound module 16 of FIG. 1 on, and the audio signal at amplifier 23 drives rectifier 29, holding latch reset 6 LOW and latch output 3 HIGH.

When the audio signal from sound module 16 ceases, RC circuit 27 discharges, producing a HIGH at reset pin 6. Since the set pin 2 is also HIGH, latch circuit 24 produces a LOW at output pin 3. Trigger line 15 will rise briefly as capacitor 32 discharges and key line 13 rises. When the key line causes transistor 25 to conduct, trigger line 15 returns to zero potential, momentarily causing reset pin 6 to go negative. Since pin 2 is HIGH, no change at output 3 of latch circuit 24 occurs. When pin 6 becomes positive, pin 3 is held negative until the next cycle of operation occurs.

As will now be recognized, a device has been disclosed that permits a transmitter to automatically transmit an audio signal, such as a tone, spoken message, or sound effect, after a microphone key is released by the user. In the preferred embodiment of the invention, the device can be manufactured as a small, low cost unit. Although a specific circuit is shown for exemplary purposes, the functions can be provided by other circuit arrangements. Such changes are considered to fall within the spirit and scope of the invention.

I claim:

1. A device for automatically re-keying a transmitter after a transmission ceases, and for thereafter transmitting a preselected audio signal comprising:
    a) key-open sensing means having an input to a first transistor connected to said transmitter, axis transistor turned on when said transmission ceases to thereby produce a trigger signal, a latch circuit connected to said first transistor, said trigger signal setting a HIGH at an output of said latch circuit, and a trigger signal output for providing an indicating signal for said preselected audio signal;
    b) auxiliary keying means responsive to said key-open sensing means for re-keying said transmitter; and
    c) audio sensing means connected to said latch circuit for sensing presence of said preselected audio signal, and for resetting said latch circuit to open said auxiliary keying means thereby un-keying said transmitter.

2. The device as defined in claim 1 in which said auxiliary keying means includes a normally OFF second transistor connected to said output of said latch circuit, and to said transmitter wherein said HIGH turns said transistor ON for re-keying said transmitter.

3. The device as defined in claim 1 in which said audio sensing means includes:
    a) a connection to said first transistor for placing an inhibit signal thereon
    b) an input connected to receive said preselected audio signal when present;
    c) a rectifier circuit for producing a dc signal from said audio sensing means input; and
    d) a comparator connected to said rectifying circuit and to said latch circuit wherein said dc signal turns said comparator OFF, and cessation of said preselected audio signal causes said comparator to turn ON, resetting said latch circuit producing a LOW at said latch circuit output.

4. The device as defined in claim 3 in which said audio sensing means further includes an audio amplifier for providing an amplified signal to said rectifying circuit, and an input for receiving said trigger signal.

5. The device as defined in claim 3 in which said audio rectifier circuit further includes a time delay circuit for maintaining said comparator OFF during pauses in said audio signal.

6. A device for automatically re-keying a transmitter after a transmission ceases, and for thereafter transmitting a preselected audio signal comprising:
  a) key-open sensor having a first transistor having an input for connecting to said transmitter, said transistor turned on when said transmission ceases for producing a trigger signal;
  b) a latch circuit connected to said first transistor, said trigger signal setting a HIGH at an output of said latch circuit, and a trigger signal output for providing an initiating signal for said preselected audio signal;
  c) a keying circuit having a normally OFF second transistor connected to said output of said latch circuit, and to said transmitter wherein said HIGH turns said transistor ON for rekeying said transmitter; and
  d) an audio sensing circuit having a connection to said first transistor for placing an inhibit signal thereon, an input connected to receive said preselected audio signal when present, a rectifier circuit for producing a dc signal from said audio sensing means input, and a comparator connected to said rectifying circuit and to said latch circuit wherein said dc signal turns said comparator OFF, and cessation of said preselected audio signal causes said comparator to turn ON, resetting said latch circuit producing a LOW at said latch circuit output.

7. The device as defined in claim 6 in which said audio sensing circuit further includes an audio amplifier for providing an amplified signal to said rectifying circuit, and an input for receiving said trigger signal.

* * * * *